Aug. 1, 1933.　　　D. E. CARPENTER　　　1,920,354
EDGE WOUND CORE
Filed Aug. 21, 1931

INVENTOR
David E. Carpenter.
BY
O. B. Buchanan
ATTORNEY

Patented Aug. 1, 1933

1,920,354

UNITED STATES PATENT OFFICE 1,920,354

EDGE-WOUND CORE

David E. Carpenter, Springfield, Mass., assignor to Westinghouse Electric & Manufacturing Company, a Corporation of Pennsylvania Application August 21, 1931. Serial No. 558,519

14 Claims. (Cl. 171—252.)

My invention relates to improvements in the laminated cores of dynamo-electric machines, particularly alternating-current machines, and it has more particular relation to improvements in the method of manufacture, resulting in material economies.

Heretofore, the best method of producing punchings for the stator and rotor cores of alternating-current machines has been to punch circular discs out of large sheets of core-iron, that is, iron suitable for use as the magnetizable core of a dynamo-electric machine, with the discs nested as close together as possible. These discs have an outer diameter equal to the outer diameter of the stator punchings. The rotor punchings were punched from the material within the inner peripheries of the stator punchings. By this method, it took, for example, for a certain washing-machine motor, a sheet weighing 19.09 pounds to produce 133 stator punchings totaling 5.43 pounds, and 133 rotor punchings totaling 3.69 pounds, resulting in a waste of 9.97 pounds or 52.2 per cent. At 4¼ cents per pound, this amounted to 42 cents per motor.

According to my present invention, I utilize long continuous strips of core-iron to make my stator punchings. These strips are punched out, in the center, to provide two strip-punchings from each strip of the iron as it comes from the rolling mill, each punching-strip having lateral teeth projecting into the spaces between similar teeth on the other punching-strip. In this way, a very small amount of waste is involved in cutting out the stator punchings. These punchings are then rolled, edgewise, to form the stator core.

The rotor punchings are stamped out of discs that are punched from a sheet of iron as heretofore, except that the discs are of considerably smaller diameter. As the amount of waste between the discs decreases as the diameter of the discs decreases, much less material is wasted, in punching these small rotor discs, than was involved in punching the larger stator discs. As a result of my invention, a saving of approximately 17 cents per motor is secured in the washing-machine motors heretofore mentioned, which is quite a material saving when motors are manufactured at the rate of hundreds of motors per day.

Figure 1:
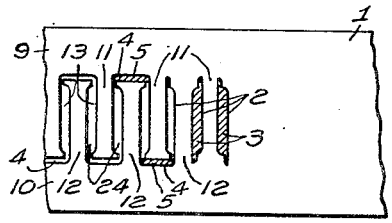
Figure 5:
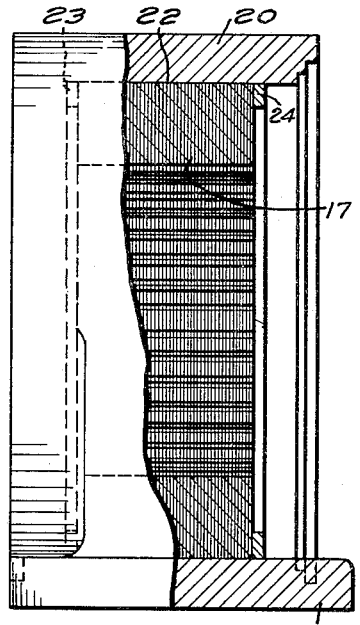
Figure 3:
Figure 4:
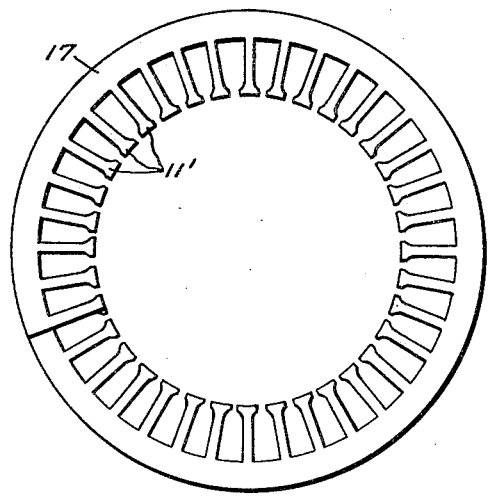
Figure 2:
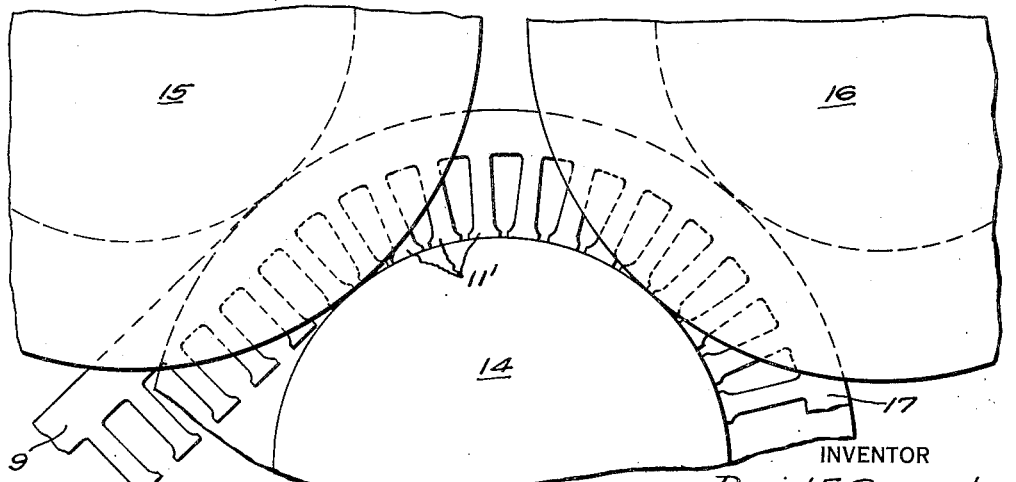

With the foregoing and other objects in view, my invention consists in the methods and products hereinafter described and claimed, and illustrated in the accompanying drawing, wherein Figure 1 is a full-scale view of a strip of sheet iron, illustrating the method of punching out my stator laminations, for the washing-machine motor previously mentioned;

Fig. 2 is a diagrammatic end view of rolls, illustrating the process of winding the stator strips on edge, and Figs. 3, 4 and 5 are views on a smaller scale, illustrating the helically wound stator laminations. Fig. 3 is a side elevation showing a few turns of the helically wound stator, Fig. 4 is an end elevation thereof, and Fig. 5 is a side view of a complete stator member, a portion of it being shown in longitudinal section, illustrating punchings assembled in a stator frame.

According to my invention, the laminated core of an electric machine is made by starting out with a long continuous strip 1 of core-iron, as shown in Fig. 1. It is then punched in a two-station die machine. In the first station, a plurality of long transverse slots 2 are punched in the center of the strip by means of an index die 3 which is indicated in Fig. 1 in cross section, by shade lines. In the second station, a plurality of shearing cuts 4 are made between opposite ends of successive pairs of slots 2, by means of a die 5, as shown in Fig. 1. These holes 2 and 4 are accurately centered in the lateral direction and are accurately spaced in the longitudinal direction, and are of such shape as to produce two punchings 9 and 10, having teeth 11 and 12 along one edge of each punching, the teeth of one punching, such as the teeth 12, being disposed in the spaces 13 between the teeth 11 of the other punching. The two punching-strips 9 and 10 are then separated from each other and each punching-strip is utilized to make a plurality of magnetic cores.

I prefer to make stator cores by my method, but it is possible to make rotor cores by the same method, except that the rotor-core punched strip could not be made so as to nest the teeth of two strips. The manufacture of rotor cores with edge-wound strips is more economical when the ratio of the width of iron at the roots of the teeth to the internal diameter is small, as is the case in some ceiling-fan punchings and in some compressor-motor rotor-punchings. When a rotor core is to be formed, the teeth are disposed on the outside, whereas, for a stator core, the teeth are disposed inwardly.

The punching-strip 9 or 10 is fed into a coiling machine which is indicated in Fig. 2 as consisting of three flanged rolls 14, 15 and 16, which receive the strip 9 and squeeze and bend it so as to produce an edge-wound helix 17 having inwardly projecting teeth 11'. It will be noted that the tips of the stator teeth 11' have been brought close together, by the rolling process, as will be seen by a comparison of Fig. 1 with either Fig. 2 or Fig. 4.

In rolling the helices, it is preferable to so adjust the process that the thickness of the teeth, which is not altered during the rolling process, is substantially the same as the maximum thickness of one turn of the edge-rolled punching, the outer periphery of each turn being of somewhat reduced thickness. This may be brought about by suitable squeezing of the outer periphery between the flanges of the rolls 14, 15 and 16 of Fig. 2, or by applying a suitably strong pull to stretch the strip 9 as it is wound edgewise, or by both methods. By making the thickness of the teeth nearly equal to the maximum thickness of the rolled punching it is possible to have a construction in which the teeth may be pressed closely together, thereby avoiding noise caused by vibration.

Finally, the punchings are preferably coated with varnish, or some other insulating means; preferably, though not necessarily, an insulating impregnating material which is capable of solidly filling the very small spaces between the thinner proportions of the punching-coils, in the finished machine. Each rolled-core is then compressed longitudinally and held in its compressed state by any suitable means, which is known to the dynamo-electric machine manufacturers, and does not constitute any part of my present invention. In order to make the illustration complete, I have shown, in Fig. 5, a cyindrical stator frame 20 having a base 21 and having an internal bore 22 in which the stator punchings are pressed and held firmly between two rings 23 and 24 which are suitably secured in the stator bore 22, either frictionally, by welding, or by any other means. In pressing the laminations together, care should be taken to see that the teeth 11' are suitably alined, as indicated in Fig. 4, so that the coil-sides of wound coils may be disposed in the "slots" or spaces between the teeth.

I am aware that it was proposed, long ago, to build stator cores out of an edge-wound strip of iron. Such proposal, however, was before the introduction of teeth for the purpose of holding the winding in slots therebetween. It is impossible, in any practicable manner, to machine out the slots between the teeth after the strip has been wound on edge, because of the burrs which would be formed by such process, to say nothing of the expense.

It would be possible to stamp out the teeth in an indexing machine after the rolling into helical form. Such a method would eliminate a large part of the savings of material which is obtained from a nesting of the teeth, as shown in Fig. 1. It would also offer difficulties, because the width of the material under strain would be much greater than in my illustrated process, and because it would make the tooth-tip much thicker than the outer rim.

It will be readily appreciated that the indexing of the holes which are punched in the center of my strip 1, as indicated in Fig. 1, must be carried out with extreme accuracy, in order to avoid the necessity for filing the teeth at a prohibitive expense, after the punching has been edge-wound. This presents no difficulty in any strip where the holes are punched in the center of it and not along its edge.

When I refer to the edge-wound strip as being "long", I mean that the strip is sufficiently long to make a helix, that is, to make, in general, a plurality of turns, as distinguished from a segmental punching construction. It is not necessary that each long continuous strip be sufficiently long to make an entire stator core member.

I claim as my invention:

1. The process of manufacturing laminated cores for electric machines, which comprises the steps of stamping holes in the center of a long continuous strip of core-iron, the holes being accurately centered in the lateral direction, and accurately spaced in the longitudinal direction, and of such shape as to produce two punchings with teeth along one edge of each, the teeth of one punching being disposed in the spaces between the teeth of the other punching, separating the punchings, and then rolling each punching on edge to form a helix, compressing it along the direction of the axis of the helix, and holding it compressed, with the teeth in substantial alinement.

2. The process of manufacturing laminated cores for electric machines, which comprises the steps of stamping holes in the center of a long continuous strip of core-iron, the holes being accurately centered in the lateral direction, and accurately spaced in the longitudinal direction, and of such shape as to produce two punchings with teeth along one edge of each, the teeth of one punching being disposed in the spaces between the teeth of the other punching, separating the punchings, and then rolling each punching on edge to form a helix, with its teeth projecting inwardly.

3. The process of manufacturing laminated cores for electric machines, which comprises the steps of stamping holes in the center of a long continuous strip of core-iron, the holes being accurately centered in the lateral direction, and accurately spaced in the longitudinal direction, and of such shape as to produce two punchings with teeth along one edge of each, the teeth of one punching being disposed in the spaces between the teeth of the other punching, separating the punchings, and then rolling each punching on edge to form a helix, with its teeth projecting inwardly, the rolling process being such that the thickness of the teeth is substantially the same as the maximum thickness of the edge-rolled laminations, the outer peripheries of the edge-rolled laminations being of slightly reduced thickness, owing to the stretching caused by the rolling process.

4. The process of manufacturing laminated cores for electric machines, which comprises the steps of stamping holes in the center of a long continuous strip of core-iron, the holes being accurately centered in the lateral direction, and accurately spaced in the longitudinal direction, and of such shape as to produce two punchings with teeth along one edge of each, the teeth of one punching being disposed in the spaces between the teeth of the other punchings, separating the punchings, and then rolling each punching on edge to form a helix, coating each helically-wound punching with an insulating material, compressing it along the direction of the axis of the helix, and holding it compressed, with the teeth in substantial alinement.

5. The process of manufacturing laminated cores for electric machines, which comprises the steps of stamping holes in the center of a long continuous strip of core-iron, the holes being accurately centered in the lateral direction, and accurately spaced in the longitudinal direction, and of such shape as to produce two punchings with teeth along one edge of each, the teeth of one punching being disposed in the spaces between the teeth of the other punching, separating the punchings, and then rolling each punching on edge to form a helix, and binding the helically-wound punching together, with the teeth in substantial alinement, and with an impregnating filler between successive turns.

6. The process of manufacturing a laminated core for an electric machine, which comprises the steps of producing a long continuous strip-punching of core-iron having teeth along one edge, rolling said punching on edge to form a helix, coating each helically wound punching with an insulating material, compressing it along the direction of the axis of the helix, and holding it compressed, with the teeth in substantial alinement.

7. The process of manufacturing a laminated core for an electric machine, which comprises the steps of producing a long continuous strip-punching of core-iron having teeth along one edge, rolling said punching on edge to form a helix, and binding the helically wound punching together, with the teeth in substantial alinement, and with an impregnating filler between successive turns.

8. The process of manufacturing a laminated core for an electric machine, which comprises the steps of producing a long continuous strip-punching of core-iron having teeth along one edge, rolling said punching, with its teeth projecting inwardly, the rolling process being such that the thickness of the teeth is substantially the same as the maximum thickness of the edge-rolled laminations, the outer peripheries of the edge-rolled laminations being of slightly reduced thickness, owing to the stretching caused by the rolling process.

9. The process of manufacturing a laminated core for an electric machine, which comprises the steps of producing a long continuous strip-punching of core-iron having teeth along one edge, rolling said punching, with its teeth projecting inwardly, the rolling process being such that the thickness of the teeth is substantially the same as the maximum thickness of the edge-rolled laminations, the outer peripheries of the edge-rolled laminations being of slightly reduced thickness, owing to the stretching caused by the rolling process, and binding the helically-wound punching together, with the teeth in substantial alinement, and with an impregnating filler between successive turns.

10. A laminated core for an electric machine comprising an edge-wound helix of a continuous strip-punching having teeth which are in substantial alinement, and having means, including an insulating impregnating agent, for binding the helically-wound punching together.

11. A laminated stator core for an electric machine comprising an edge-wound helix of a continuous strip-punching having inwardly directed teeth which are in substantial alinement, and having means, including an insulating impregnating agent, for binding the helically-wound punching together.

12. A laminated stator core for an electric machine comprising an edge-wound helix of a continuous strip-punching having inwardly directed teeth which are in substantial alinement, characterized by the fact that the thickness of the teeth is substantially the same as the maximum thickness of the turns of the helically-wound punching, the outer periphery of each turn being of slightly less thickness.

13. A laminated core for an electric machine comprising an edge-wound helix of a continuous strip-punching having teeth which are in substantial alinement, and having means for binding the helically-wound punching together.

14. A building-material for a laminated magnetizable core for an electric machine comprising a magnetizable strip having inner and outer edges having dissimilar degrees of curvature materially greater than zero, with the outer edge thinner than the inner edge, and having teeth in one of said edges.

DAVID E. CARPENTER.